Oct. 12, 1948.    E. F. W. ALEXANDERSON ET AL    2,451,189
ELECTRIC FREQUENCY TRANSFORMATION SYSTEM
Filed Oct. 18, 1947

Inventors:
Ernst F. W. Alexanderson,
Albert H. Mittag,
Marion W. Sims,
by Crowell S. Mack
Their Attorney.

Patented Oct. 12, 1948

2,451,189

UNITED STATES PATENT OFFICE 2,451,189

ELECTRIC FREQUENCY TRANSFORMATION SYSTEM

Ernst F. W. Alexanderson and Albert H. Mittag, Schenectady, N. Y., and Marion W. Sims, Fort Wayne, Ind., assignors to General Electric Company, a corporation of New York Application October 18, 1947, Serial No. 780,618

17 Claims. (Cl. 172—281)

1

Our invention relates to an electric frequency transformation system without rotating or moving parts or elements, and more particularly to static frequency transformation apparatus of the oscillatory type utilizing pulse excitation.

Many forms of static frequency changers have been proposed or used in the past, particularly in connection with radio applications. One well known form operates on the principle of asymmetrical variation of flux with magnetizing force in saturated iron cores such as the Joly frequency tripler and the Pohl frequency doubler. These methods have the disadvantage of excessive iron losses, particularly at the higher frequencies of the power input frequency of the order of 60 cycles.

It is an object of our invention to provide a new and improved static frequency transformation system.

It is another object of our invention to provide a new and improved frequency changing system, without moving parts or elements, which is simple and reliable in operation and readily adjusted for various different output frequencies each of which is a different multiple of the frequency of the input power supply.

In accordance with the illustrated embodiments of our invention, we utilize a resonant output or tank circuit tuned substantially to the desired output frequency which is a harmonic of the source voltage, and excite the tank circuit with electric impulses coinciding with predetermined positive and negative half cycles of the harmonic voltage. The number and phase displacement of the impulse producing circuits and the resonant frequency of the tank circuit may be varied to produce various other harmonics of the source voltage.

Our invention will be better understood from the following description taken in connection with the accompanying drawing, and its scope will be pointed out in the appended claims.

Figure 1:
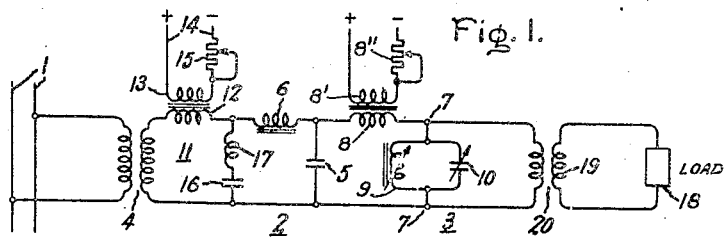
Figure 2:
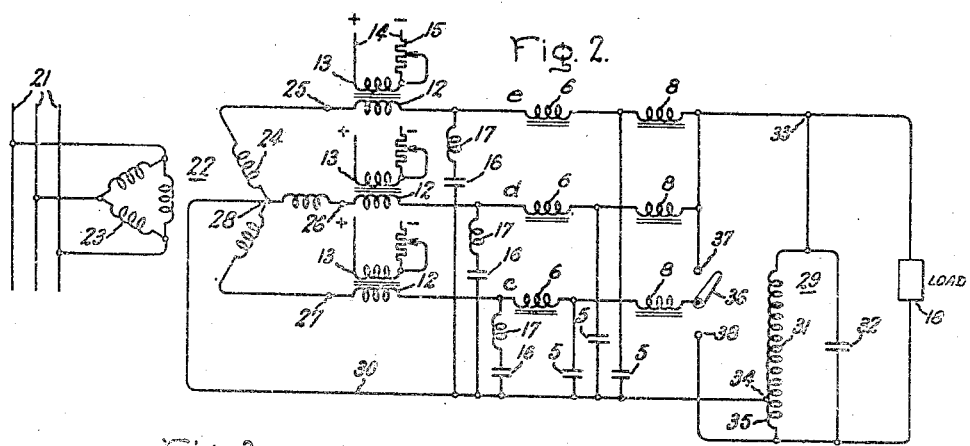
Figure 3:
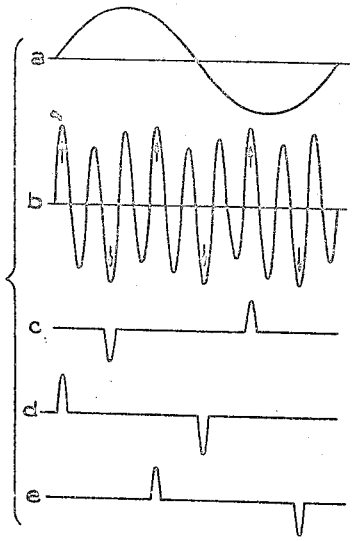
Figure 4:
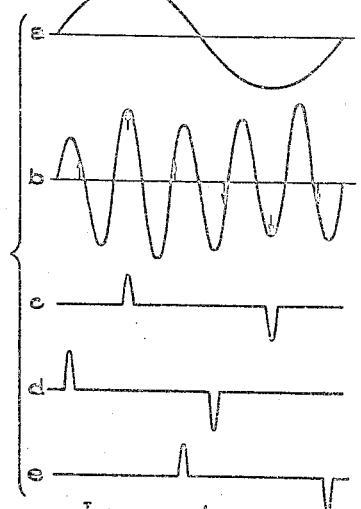

In the drawing, Fig. 1 diagrammatically illustrates a single phase embodiment of our invention; Fig. 2 illustrates a three phase embodiment of our invention; Fig. 3 is an explanatory diagram relative to the operation of the embodiment of Fig. 2 when adjusted for a ninth harmonic output of an input voltage, and Fig. 4 is an explanatory diagram relative to the operation of the embodiment of Fig. 2 when adjusted for a fifth harmonic output of an input voltage.

Referring to Fig. 1 of the drawing, I indicates a supply circuit or a source voltage which is connected to supply power to an impulse circuit 2 and a resonant tank circuit 3. The impulse circuit per se is of the type described in U. S. Patent No. 2,362,294, granted November 7, 1944 upon an application of A. H. Mittag. The impulse circuit is connected to be energized from the supply circuit I, either directly or through transforming means 4 as illustrated. The output winding of transformer 4 is connected to energize a capacitor 5, acting as an energy storage means, through a linear reactor 6 which serves to prevent discharge of the caapcitor 5 to the supply circuit and also serves to limit the amount of current derived from the supply circuit I at the time capacitor 5 is discharged. Capacitor 5 is connected to energize the resonant tank circuit 3 at terminals 7 thereof through a non-linear inductive device 8, such as a self-saturating symmetrically saturable reactor, and thereby impress upon the tank circuit voltage impulses twice during each cycle of the supply voltage at time intervals displaced 180 electrical degrees referred to the supply voltage frequency. In the event it is desired to adjust the phase displacement between the voltage impulses, the inductive device 8 may be provided with a direct current saturating winding 8' having a current adjusting means 8" connected in circuit therewith and energized from a direct current source indicated by the + and − signs. The tank circuit may be of various types of oscillating circuits known in the art, although we have found the parallel resonant type, illustrated as comprising an inductive reactance element 9 and a capacitor 10 connected in parallel relation across the impulse circuit, operates very satisfactorily. The reactive elements 9 and 10 of the tank circuit are indicated as being adjustable and as representative of one way the tank circuit can be tuned for different output frequencies. A phase shifting circuit 11 may be interposed between the supply circuit I and the impulse generating circuit 2. This phase shifting circuit may be of various forms known in the art, but a simple direct current saturable reactor type as illustrated is satisfactory. This type comprises an alternating current winding 12 connected in series relation with the circuit to the impulse circuit arranged on a conventional iron core with a direct current saturating winding 13 thereon connected to be energized from a suitable direct current circuit 14 through adjustable resistance means 15. A further refinement may be incorporated in the phase shifting means 11, if desired, in order to maintain the output voltage of the impulse circuit at a substantially constant value throughout an appreciable range of phase shift of the output impulse voltage with respect to the voltage of circuit 1. For this purpose a circuit which has a net capacitive reactance is connected across the input circuit between the phase shift circuit 11 and the impulse circuit and, as illustrated, this corrective circuit comprises a capacitor 16 connected in series relation with an inductance 17. The inductance 17 is employed for the purpose of suppressing undesirable oscillations and voltage transients from the impulse circuit to the supply circuit 1. In adjusting or selecting this part of the circuit, the capacitive reactance of capacitor 16 is made substantially greater than the inductive reactance of inductance 17, and the difference therebetween is made greater than the inductive reactance of the impulse circuit 2.

A load circuit 18 is connected to be energized either directly from the output terminals 7 of the tank circuit 3 or, as illustrated, from the secondary winding 19 of transforming means 20, depending upon the voltage rating and other electrical characteristics of the particular load to be energized. We have operated various types of loads from a tank circuit of this kind including a bank of some twenty to twenty-five fluorescent lamps and an induction motor at the 5th, 7th and 9th harmonics of a 60 cycle supply system.

It will be understood by those skilled in the art that a combination of duplicate circuits as shown in Fig. 1 may be used with the output circuits thereof displaced in phase and interconnected to provide a polyphase output, without departing from our invention in its broader aspects.

The operation of the embodiment of our invention illustrated in Fig. 1 is substantially as follows: The tank circuit 3 is tuned to the desired output frequency which may be assumed, for purposes of explanation, as being the ninth harmonic of the fundamental of a sixty cycle supply circuit. The impulse circuit provides two electric impulses displaced 180 degrees referred to the fundamental frequency of 60 cycles and for each cycle thereof. During the first part of each half cycle, the nonlinear inductive device 8 provides a relatively high impedance to the flow of current so that very little current is transmitted to the tank circuit 7 for this interval. As the voltage of the source increases still further, the current flowing through device 8 causes it to saturate, effecting an abrupt decrease in the value of the inductive reactance thereof and thereby effecting a substantial increase in the amount of current transmitted to the tank circuit 7. In other words, an impulse of voltage or current is produced as shown by curves c, d, or e of Fig. 3. At this time, the capacitor 5 discharges through the tank circuit, thereby assuring the transmission of a positive pulse of current to the tank circuit in one direction. During the next succeeding half cycle of voltage of source 1, the impulse circuit 2 will produce an impulse of voltage of opposite polarity to the tank circuit. With the tank circuit tuned to the 9th harmonic of the assumed 60 cycle fundamental source the voltage impulses will, in this single phase embodiment, coincide with every 9th cycle of the tank circuit so that the output voltage would have a nine half-cycle variation in magnitude due to the spacing of the power impulses. If the power impulses do not coincide with the desired half cycle of the tank circuit, or occur at the most advantageous point in the half cycle, the phase shift circuit may be utilized to shift the time of occurrence of the impulses relative to the occurrence of the maximum amplitude of the output frequency wave if the output circuit is tied in phase position with the source voltage. However, in the usual case this tie would not be utilized and a phase displacement between peaks could be effected by the saturating winding 8' or the impulse reactor 8.

In Fig. 2 we have shown a three phase embodiment of our invention utilizing a single tank circuit and a plurality of impulse circuits displaced in phase so that the tank circuit receives more impulses per cycle of the voltage of the supply circuit. A three-phase supply circuit 21 is connected to energize a transformer 22 having a primary winding 23, illustrated in delta connection, and a Y-connected secondary winding 24 having phase terminals 25, 26 and 27 displaced in phase the usual 120 degrees referred to the assumed fundamental frequency supply of 60 cycles of a three-phase circuit. The Y-connected secondary winding 24 is also provided with a neutral terminal 28. The three impulse circuits are designated c, d and e, and each impulse circuit comprises the same elements including the phase shift means which have been illustrated for the single phase embodiment of Fig. 1, and each corresponding element has therefore been identified with like reference numerals. Each of the impulse circuits c, d and e is connected, respectively, to phase terminals 27, 26 and 25 and to one side of a tank circuit 29. The circuit is completed from the other side of the tank circuit through a conductor 30 to the neutral 28 of transformer 24. All across-the-phase circuits of the impulse circuits are connected from the corresponding phase conductor of its associated phase and the neutral conductor 30. For example, capacitor 5 of impulse circuit e is connected between the phase conductor e and the neutral conductor 30. For certain purposes, the tank circuit 29 may be a simple tank circuit, as shown in Fig. 1, comprising an inductance element 31 and a capacitor 32 connected in parallel relation across the output terminals 33 and 34 of the impulse circuits. For certain purposes, for example, in connection with the generation of harmonics which are not divisible by three, such as the 5th, 7th, 11th and 13th, it may be desirable to use an extended section 35 on the inductance element 31 and provide a switch 36 with contacts 37 and 38 so that switch 36 can be moved from its contact 37, where all impulse circuits are connected to the same point and side of the tank circuit to its contact 38 so as to connect one of the impulse circuits, such as c, to the lower terminal of the extended winding 35 of inductance element 31. Switch 36 when moved to contact 38 in effect reverses the phase of the impulses of one impulse circuit relative to the other two impulse circuits. When the output frequency is divisible by three and a three phase impulse circuit is utilized, the switch 36 is not necessary. Similarly, if the output frequency is not divisible by three and the number of impulse circuits corresponds to the frequency of the output circuit or bears the proper relation to the output circuit, the switch 36 may not be necessary. However, with a three phase impulse circuit and with an output frequency not divisible by three the switching arrangement may be desirable in order to obtain a more efficient relation between the impulses and the positive and negative half cycles of the output voltage. This will be more readily understood after a consideration of the operation of the system for the 5th, 7th, 11th, etc. harmonics. It will also be apparent after due consideration that the phase shift circuits in each impulse circuit would not be necessary in various uses of the system, with proper correlation between the number and timing of the impulse circuits relative to the frequency of the harmonic output frequency.

In Fig. 3 we have shown a copy of an actual oscillogram taken with the embodiment of Fig. 2 operating with a 60 cycle input voltage and a 9th harmonic output voltage with switch 36 closed to contact 37. In this figure, curve $a$ represents one cycle of the 60 cycle voltage; curve $b$ represents the 9th harmonic output voltage wave, and curves $c$, $d$ and $e$ represent the impulse voltage waves. The arrows on curve $b$ represent the particular half cycles of the output voltage wave in which an impulse occurs.

In Fig. 4 we have shown a group of curves illustrative of the operation of the embodiment of Fig. 2 operating with a 60 cycle input voltage and a 5th harmonic output voltage, with switch 36 closed to contact 38. In this figure, curve $a$ represents one cycle of the 60 cycle voltage; curve $b$ represents the 5th harmonic output voltage wave and curves $c$, $d$ and $e$ represent the impulse voltage waves with curve $c$ reversed relative to curve $c$ of Fig. 3 for reasons to be pointed out in the description of operation of Fig. 2.

The operation of the embodiment of the invention illustrated in Fig. 2 is substantially as follows: It will first be assumed that the system is energized from a 60 cycle voltage source and operating with switch 36 closed to contact 37. Each of the impulse circuits operates in the manner described heretofore in connection with the consideration of Fig. 1 and produces two peaks for each input cycle which are displaced 180 electrical degrees referred to the assumed 60 cycle system, as shown by curve $c$, $d$ or $e$ of Fig. 3. Due to the three phase connection illustrated, the three impulse circuits are displaced 120 electrical degrees referred to the 60 cycle system and thereby produce six impulses per cycle of the 60 cycle supply which are displaced 60 electrical degrees. It will be assumed that the tank circuit is tuned to the 9th harmonic of the 60 cycle system and oscillating to produce a voltage wave as shown by curve $b$ of Fig. 3. It will be noted that a power impulse coincides with every third half cycle of the tank circuit voltage. Due to the particular order of succession of the power impulses, the output voltage has a three half cycle variation in magnitude. The voltage variation depends on the relative kva. rating of the tank circuit and the watts of the load circuit. The output voltage wave shape shown in Fig. 3 is an oscillographic trace when the inductive kva. in the tank circuit was of the order of six times the output power. The circuit of the embodiment shown in Fig. 2 with switch 36 connected to contact 37, or in fact with the switch omitted and a permanent connection made between 36 and 37, may also be tuned for the third, ninth or fifteenth harmonic, or any harmonic divisible by three, of the sixty cycle system, without any change in the phase relation of the impulse circuits.

By utilization of the switch 36 and closing it to contact 38, the circuit, by proper tuning, is readily adapted for operation at the fifth, seventh, eleventh or thirteenth, or any odd harmonic indivisible by three, of the input system, without any other change in the phase relation of the impulse circuits. A wide range of all the odd multiples of the fundamental frequency may be particularly desirable for the purpose of operating an induction motor at variable speed. The function of switch 36 will become apparent by examining Fig. 4. If the circuit of Fig. 2 is now tuned for the fifth harmonic and no change is made in the impulse circuits, the $c$ phase impulse would not coincide with a half cycle of the output circuit voltage but would be in phase opposition and thus cause a lower output. Upon phase reversal of the $c$ phase impulse circuit, each of the impulse peaks from all of the impulse circuits occurs in the proper direction for each half cycle of the output voltage, although within one cycle of the assumed 60 cycle system exact phase coincidence of the impulses with output voltage half cycles occurs only for the third and eighth half cycles. The impulse from the $d$ circuit occurs toward the end of the first half cycle of the output voltage, while the impulse from the $e$ circuit occurs at the beginning of the 5th half cycle. Thus for the first five half cycles of the output voltage an impulse occurs in every alternate positive half cycle, whereas in the last five half cycles an impulse occurs in every alternate negative half cycle.

The utility of the phase shift means in each impulse circuit of a polyphase circuit will become apparent from a consideration of Fig. 2 of this particular operating condition of Fig. 2. For example, if the phase of the $d$ impulse circuit were advanced relative to the $c$ circuit of the order of 12 degrees referred to the 60 cycle system, this would advance the phase of the impulse some 60 degrees on the first half cycle of the output voltage wave and a corresponding amount in the 6th half cycle to move these impulses into phase coincidence with the output half cycles identified. Similarly, if the phase of the $e$ impulse circuit were retarded relative to the $c$ circuit of the order of 12 degrees referred to the 60 cycle system, this would retard the phase of the impulse some 60 degrees on the fifth and tenth half cycles into phase coincidence with the output half cycles last mentioned.

From the foregoing description, it will be understood that our invention may be carried out with polyphase input sources of any odd number of phases and that the number and phase displacement of the impulse producing circuits and the resonant frequency of the output circuit may be varied to produce or approach the optimum conditions for maximum output for a large number of the different harmonics of various selected input frequencies. However, for any output frequency it is desirable to adjust or select the different variable conditions so that the maximum amplitude of the fundamental of the peak or impulse current or voltage and the maximum amplitude of the voltage of the tank or output circuit in which the peaks occur are substantially in phase coincidence.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. A frequency transformation system comprising, an alternating voltage input circuit and an output circuit for operation at a frequency which is a multiple of the frequency of the input circuit, resonant circuit means interconnecting said input and output circuits and tuned substantially to the multiple frequency of the output circuit, and electric impulsing means interposed between said input circuit and said resonant circuit means for periodically impressing electric impulses upon said resonant circuit in predetermined positive and negative half cycles of the voltage of the output circuit.

2. A frequency transformation system comprising, an alternating voltage input circuit and an output circuit for operation at a frequency which is a harmonic of the fundamental frequency of said input circuit, an oscillatory tank circuit comprising inductance and capacitance impedance elements connected to be energized from said input circuit and connected to said output circuit and tuned substantially to the harmonic frequency of the output circuit, and magnetic electric impulsing means connected between said input circuit and said tank circuit for periodically impressing electric impulses upon said tank circuit in predetermined positive and negative half cycles of the voltage of the output circuit.

3. A frequency transformation system comprising, an alternating voltage input circuit and an output circuit for operation at a frequency which is a harmonic of the fundamental frequency of said input circuit, an oscillatory tank circuit comprising inductance and capacitance impedance elements connected to be energized from said input circuit and connected to said output circuit and tuned substantially to the harmonic frequency of the output circuit, and an electric impulsing circuit connected in said input circuit for supplying to said tank circuit voltage peaks of opposite polarity and comprising a capacitance connected to be charged from said input circuit during each half cycle of voltage thereof and a non-linear inductive device having an abrupt decrease in impedance on both half cycles of voltage of the input circuit and connected to discharge said capacitor to said tank circuit during each half cycle of the voltage of the input circuit.

4. A frequency transformation system comprising, an alternating voltage input circuit and an output circuit for operation at a frequency which is a harmonic of the fundamental frequency of said input circuit, an oscillatory tank circuit comprising inductance and capacitance impedance elements connected to be energized from said input circuit and connected to said output circuit and tuned substantially to the harmonic frequency of the output circuit, a capacitor connected between said input circuit and said tank circuit to be charged from said input circuit during each half cycle of the voltage thereof, means interposed between said capacitor and said tank circuit and comprising a non-linear inductive device which has an abrupt decrease in impedance on both half cycles of the voltage of the input circuit to cause abrupt increases in the discharge current of said capacitance to said tank circuit during each half cycle of the voltage of the input circuit, and means connected between said input circuit and said capacitor for controlling the phase of the impulses of current transmitted to said tank circuit.

5. A frequency transformation system comprising, a parallel resonant circuit of inductance and capacitance elements, an alternating current supply circuit connected to energize said resonant circuit, an output circuit connected to said resonant circuit for operation at a frequency which is a multiple of the frequency of the input circuit, said resonant circuit being tuned at substantially said multiple frequency, a capacitor connected between said resonant circuit and said supply circuit and connected to be charged from said supply circuit and to discharge to said resonant circuit, and a self-saturating reactor connected in series relation between said capacitor and said resonant circuit and saturating on both half cycles of the discharge current of said capacitor to said resonant circuit to impress thereupon periodic peaks of current in predetermined half cycles of the voltage of the output circuit.

6. A frequency transformation system comprising, an $n$-phase alternating current input circuit, where $n$ is any odd number, and an output circuit for operation at a frequency which is a harmonic of the fundamental frequency of said input circuit, an oscillatory tank circuit comprising inductance and capacitance impedance elements connected to be energized from said input circuit and connected to said output circuit and tuned substantially to the frequency of the output circuit, and electric impulsing means connected between said input circuit and said tank circuit and comprising a plurality of branch impulse circuits each having an energizing voltage displaced in phase from the other branch circuits and each having connected in circuit therewith magnetic impulsing means for providing from each branch circuit two peaks of voltage for each cycle of the voltage of said input circuit.

7. A frequency transformation system comprising, a polyphase alternating current input circuit and an output circuit for operation at a frequency which is a harmonic of the fundamental frequency of said input circuit, an oscillatory tank circuit comprising inductance and capacitance impedance elements connected to be energized from said input circuit and connected to said output circuit and tuned substantially to the frequency of the output circuit, and electric impulsing means connected between said input circuit and said tank circuit and comprising a plurality of branch impulse circuits each having an energizing voltage displaced in phase from the other branch circuits and each having connected in circuit therewith magnetic impulsing means for providing from each branch circuit two peaks of voltage for each cycle of the voltage of said input circuit.

8. A frequency transformation system comprising, a polyphase alternating current input circuit and an output circuit for operation at a frequency which is a harmonic of the fundamental frequency of said input circuit, an oscillatory tank circuit comprising inductance and capacitance impedance elements connected to be energized from said input circuit and connected to said output circuit and tuned substantially to the frequency of the output circuit, electric impulsing means connected between said input circuit and said tank circuit and comprising a plurality of branch impulse circuits each having an energizing voltage displaced in phase from the other branch circuits and each having connected in circuit therewith magnetic impulsing means for providing from each branch circuit two peaks of voltage for each cycle of the voltage of said input circuit, and phase shifting means connected in each branch circuit for shifting the phase of the peaks in each branch circuit relative to the peaks in the other branch circuits.

9. A frequency transformation system comprising, a three phase alternating current input circuit and a single phase output circuit for operation at a frequency which is a multiple of the fundamental frequency of said input circuit, an oscillatory tank circuit comprising inductance and capacitance impedance elements connected to be energized from said input circuit and connected to said output circuit and tuned substantially to the frequency of the output circuit, and an electric impulsing circuit for said tank circuit comprising three branch circuits in three phase relation connected to one side of said tank circuit and a return circuit from the other side of said tank circuit to said three phase input circuit, each of said branch circuits including a self-saturating reactor which is symmetrically saturable on both half cycles of voltage of the input circuit for impressing electric impulses upon said tank circuit in predetermined order of succeeding half cycles of the output voltage.

10. A frequency transformation system comprising, a three-phase alternating current input circuit and a single phase output circuit for operation at a multiple of the fundamental frequency of said input circuit divisible by three, an oscillatory tank circuit comprising inductance and capacitance elements connected to said output circuit and tuned substantially to the said multiple frequency of said output circuit, and a three-phase magnetic impulsing circuit interposed between said input circuit and said tank circuit and providing power impulses coinciding with predetermined positive and negative half cycles of the voltage of said tank circuit.

11. A frequency transformation system comprising, a three-phase alternating current input circuit and a single phase output circuit for operation at the ninth harmonic of the fundamental frequency of said input circuit, an oscillatory tank circuit comprising inductance and capacitance elements connected to said output circuit and tuned substantially to the ninth harmonic of said tank circuit, and a three phase magnetic impulsing circuit including a saturable reactor in each phase and interposed between said input circuit and said tank circuit to provide power impulses coinciding with every third half cycle of the voltage of said tank circuit.

12. A frequency transformation system comprising, a three phase alternating current input circuit and a single phase output circuit for operation at a frequency which is a multiple of the fundamental frequency of said input circuit, an oscillatory tank circuit comprising parallel-connected inductance and capacitance elements connected to said output circuit and tuned substantially to the frequency of the output circuit, said input circuit including polyphase transforming means having a Y-connected three phase secondary winding with three phase terminals and a neutral terminal, three branch impulse circuits connected between the respective phase terminals of said secondary winding and one side of said tank circuit, a return circuit interconnecting the other side of said tank circuit and said neutral terminal, a saturable reactor connected in series relation with each branch circuit, and a capacitor interposed between said secondary winding and said saturable reactor in each branch circuit and connected across each branch circuit and said return circuit.

13. A frequency transformation system comprising, a three phase alternating current input circuit and a single-phase output circuit for operation at a frequency which is a multiple of the fundamental frequency of said input circuit, an oscillatory tank circuit comprising parallel-connected inductance and capacitance elements connected to said output circuit and tuned substantially to the frequency of the output circuit, said input circuit including polyphase transforming means having a Y-connected three phase secondary winding with three phase terminals and a neutral terminal, three branch impulse circuits connected between the respective phase terminals of said secondary winding and one side of said tank circuit, a return circuit interconnecting the other side of said tank circuit and said neutral terminal, a saturable reactor connected in series relation with each branch circuit, a capacitor interposed between said secondary winding and said saturable reactor in each branch circuit and connected across each branch circuit and said return circuit, and impedance phase shifting means connected in one of said branch impulse circuits.

14. A frequency transformation system comprising, a three phase alternating current input circuit and a single-phase output circuit for operation at a frequency which is a multiple of the fundamental frequency of said input circuit, an oscillatory tank circuit comprising inductance and capacitance elements connected to said output circuit and tuned substantially to the frequency of the output circuit, a three phase magnetic impulsing circuit interconnecting said input circuit and said tank circuit and providing power peak impulses coinciding with predetermined positive and negative half cycles of the voltage of said tank circuit, and means for reversing the phase of the peaks of one of said branch circuits relative to the other two branch circuits.

15. A frequency transformation system comprising, a three phase alternating current input circuit and a single-phase output circuit for operation at a frequency which is a multiple of the fundamental frequency of said input circuit, an oscillatory tank circuit comprising inductance and capacitance elements connected to said output circuit and tuned substantially to the frequency of the output circuit, a three phase magnetic impulsing circuit comprising three branch circuits in three phase relation interconnecting said input circuit and said tank circuit, and selective switching means connected in circuit with one of said branch circuits for connecting all of said branch circuits to one side of said tank circuit for harmonic output frequencies of said input circuit which are divisible by three and for connecting one side of one of said branch circuits to the opposite side of said tank circuit for odd harmonic output frequencies of said input circuit which are indivisible by three.

16. A frequency transformation system comprising, a three phase alternating current input circuit and a single-phase output circuit for operation at a frequency which is a multiple of the fundamental frequency of said input circuit, an oscillatory tank circuit comprising a parallel-connected inductive winding and a capacitor having a pair of junction terminals connected to said output circuit and tuned substantially to the frequency of the output circuit, said inductive winding being provided with an intermediate tap terminal, said input circuit including polyphase transforming means having a Y-connected three phase secondary winding with three phase terminals and a neutral terminal, two branch impulse circuits connected between two phase terminals of said secondary winding and one of said junction terminals of said tank circuit, a two-position switch having a switching member and two contact terminals, one of said contact terminals being connected to said one of said junction terminals and the other of said contact terminals being connected to the other of said junction terminals, a third branch impulse circuit connected between the third of said phase terminals and said switching member, a return circuit interconnecting said intermediate tap and said neutral terminal, and saturable inductive means connected in series relation with each branch circuit.

17. A frequency transformation system comprising, a three phase alternating current input circuit and a single-phase output circuit for operation at a frequency which is a multiple of the fundamental frequency of said input circuit, an oscillatory tank circuit comprising inductance and capacitance elements connected to said output circuit and tuned substantially to the frequency of the output circuit, a three phase magnetic impulsing circuit comprising three branch circuits in three phase relation interconnecting said input circuit and said tank circuit, selective switching means connected in circuit with one of said branch circuits for connecting all of said branch circuits to one side of said tank circuit for harmonic output frequencies of said input circuit which are divisible by three and for connecting one side of one of said branch circuits to the opposite side of said tank circuit for harmonic output frequencies of said input circuit which are indivisible by three, and phase shifting means connected in each of said impulse branch circuits.

ERNST F. W. ALEXANDERSON.
ALBERT H. MITTAG.
MARION W. SIMS.

No references cited.